United States Patent [19]

Moese et al.

[11] Patent Number: 5,440,663
[45] Date of Patent: Aug. 8, 1995

[54] COMPUTER SYSTEM FOR SPEECH RECOGNITION

[75] Inventors: Gerald Moese, Alsfeld-Eifa; Karlheinz Mohr, Sinsheim; Upali Bandara, Leimen, all of Germany

[73] Assignee: International Business Machines Corporation, Armonk, N.Y.

[21] Appl. No.: 72,624

[22] Filed: Jun. 4, 1993

[30] Foreign Application Priority Data

Sep. 28, 1992 [EP] European Pat. Off. ........... 92116527

[51] Int. Cl.⁶ .............................................. G01L 7/00
[52] U.S. Cl. ...................................... 395/264; 395/2; 395/2.65; 395/2.6
[58] Field of Search .................. 395/2, 2.49, 2.6, 2.61, 395/2.64, 2.65; 381/43

[56] References Cited

U.S. PATENT DOCUMENTS

| | | | |
|---|---|---|---|
| 3,770,892 | 11/1973 | Clapper | 395/2.6 |
| 4,718,094 | 1/1988 | Bahl et al. | 395/2.65 |
| 4,759,068 | 7/1988 | Bahl et al. | 381/43 |
| 4,882,759 | 11/1989 | Bahl et al. | 381/51 |
| 5,031,217 | 7/1991 | Nishimura | 381/43 |
| 5,072,452 | 12/1991 | Brown et al. | 381/43 |

FOREIGN PATENT DOCUMENTS 0241768 of 1987 European Pat. Off. .

OTHER PUBLICATIONS

The Lincoln Tied Mixture HMM Continuous Speech Recognizer Paul, IEEE 14–17 May 1991.
Automatic Contruction of Fenemic Markov Word Models for Speech Recognition Ferretti et al. IBM Technical Discl. Bulletin Nov. 1990.
Bahl et al. "Automatic Phonelic Baseform Determintation" IEEE/1991, pp. 173–176.
Bahl et al. "Adaptation of Large Vocabulary Recognition System Parameters" IEEE 1992.
Pieraccini, R. "Speaker Independent recognition of Italian telephone speech with mixture density hidden Markov models". *Speech Communication,* vol. 10, No. 2, Jun. 1991, pp. 105–115.
Schwartz, R., et al. "Improved Hidden Markov Modeling of Phonemes For Continuous Speech Recognition". *Proceedings 1984 IEEE International Conference on Acoustics, Speech and Signal Processing,* San Diego, Calif., Mar. 1984, pp. 35.6.1–35.6.4.
Wood, L. C., et al. "Improved Vocabulary–Independent Sub–Word HMM Modeling". *Proceedings 1991 IEEE International Conference on Acoustics, Speech and Signal Processing,* Toronto, Ontario, May 1991, pp. 181–184.

*Primary Examiner*—Allen R. MacDonald
*Assistant Examiner*—Richemond Dorvil
*Attorney, Agent, or Firm*—Marc D. Schechter; Robert P. Tassinari, Jr.

[57] ABSTRACT

The invention concerns a computer system for speech recognition with a word table and a triphone table in its memory. In response to a new word not contained in the word table and which is encountered by the computer system during recognition of an unknown spoken text, the fenemic baseform of this new word may be synthetically produced with the aid of a triphone table. For this purpose, the new word is decomposed into triphones, and the fenemic sequences associated with the individual triphones are read from the triphone table. The fenemic sequences are concatenated according to the phonetic baseform of the new word such that the fenemic baseform of the new word is obtained.

14 Claims, 4 Drawing Sheets

FIG.1A

| WORDS | FENEMIC BASEFORMS |
|---|---|
| ⋮ | ⋮ |
| AUTO | |
| VORHANG | ..., 19, 28, 192, ... |
| ⋮ | ⋮ |

FIG.1B

| TRIPHONES | FENEMIC SEQUENCES |
|---|---|
| ⋮ | ⋮ |
| X-B-Aː | 172, 57, 79, 12, ... |
| B-Aː-N | 21, 151, 139, ... |
| Aː-N-H | • |
| N-H-Oː | • |
| H-Oː-F | • |
| Oː-F-X | • |

FIG. 3

SPOKEN TRAINING TEXT
↓
DECOMPOSITION OF TEXT INTO TRIPHONES, UNIPHONES, ...
↓
APPLICATION OF 'GROWING' ALGORITHM TO TRIPHONES, UNIPHONES, ...
↓
STORING OF DERIVED FENEMIC SEQUENCES ASSOCIATED WITH TRIPHONES, UNIPHONES, ... IN TRIPHONE, UNIPHONE, ... TABLES

FIG. 2A

| UNIPHONES | FENEMIC SEQUENCES |
|---|---|
| N | • |
| A: | • |
| H | • |
| • | • |
| • | • |
| • | • |

FIG. 2B

| 1.5-PHONES | FENEMIC SEQUENCES |
|---|---|
| X/2-B-A:/2 | |
| B/2-A:-N/2 | • |
| A:/2-N-H/2 | • |
| • | • |
| • | • |
| • | • |

FIG. 2C

| CLASSIFIED TRIPHONES | FENEMIC SEQUENCES |
|---|---|
| C1-A-C2 | |
| C3-A-C1 | • |
| C2-B-C4 | • |
| • | • |
| • | • |
| • | • |

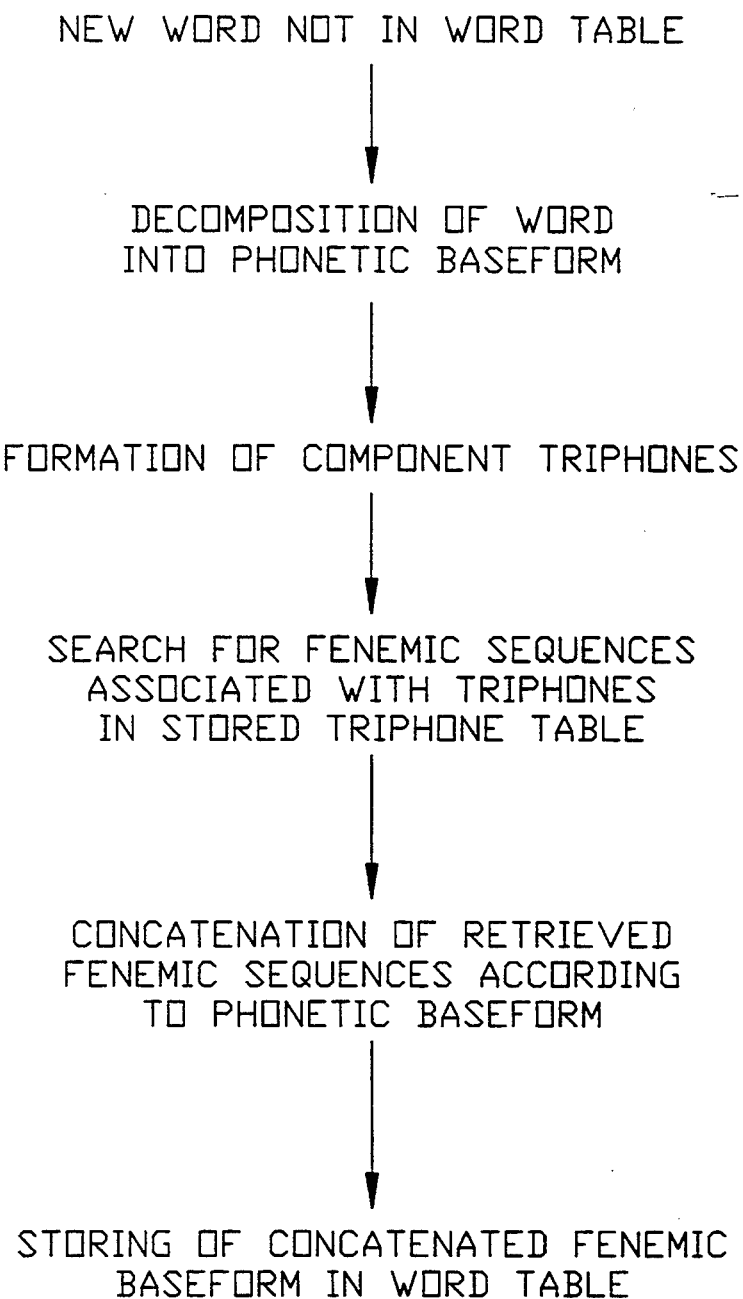

COMPUTER SYSTEM FOR SPEECH RECOGNITION

BACKGROUND OF THE INVENTION

The invention concerns a computer system for speech recognition with means for producing fenemic baseforms of words, where the fenemic baseform of a word comprises a number of acoustic labels. Means are provided for storing the words and their associated fenemic baseforms.

In speech recognition computer systems known in the art, a text spoken by a speaker is converted by the computer System into the corresponding character form. The spoken text is recognized by comparing acoustic information obtained by the computer system from a previously spoken training text with acoustic information derived by the computer system from the text to be recognized. The acoustic information from the spoken training text includes a word table, in which all words known to, and therefore recognizable by, the computer system are stored. For each word in the word table, the acoustic information includes the word's fenemic baseform, which has been produced in a known manner from the spoken training text on a word basis by the so-called "growing" algorithm or Viterbi alignment. (Lalit R. Bahl et al. "Constructing Markov Models of Words From Multiple Utterances." U.S. Pat. No. 4,759,068.)

If a spoken text to be recognized contains a new word not contained in the word table, it is not possible for the computer system to recognize this new word correctly.

Previously, it was necessary to produce the fenemic baseform of the new word from a new spoken training text containing the word and to store the word in the word table. If the new word subsequently occurred in a text to be recognized, it was found in the thus expanded word table and therefore identified. The effort required, particularly in speaking the new training text, is clearly much too extensive.

In an article entitled "Automatic Construction of Fenemic Markov Word Models For Speech Recognition" by M. Ferretti et al (*IBM Technical Disclosure Bulletin*, Vol. 33, No. 6b, Nov. 1990, pp. 233-237), another method is disclosed which attempts to produce more easily the fenemic baseform of a new word previously unknown to the computer system and to store this word in the word table. For this purpose, the new word is first converted into its phonetic baseform. The phonetic baseform is then divided into so-called triphones, whereby a triphone is a sequence of three consecutive sounds of the phonetic baseform. The triphones contained in the new word are searched for in the words already in the word table in order to employ the leafemic baseform of the middle sound of the retrieved triphone in place of the corresponding position of the fenemic baseform of the new word. The fenemic baseform of the new word is thus constructed from a number of leafemic baseforms. If a triphone of the new word is not contained in the word table, the search for similar triphones is continued with the aid of similarity matrices. In particular, the processing of these similarity matrices can require a large amount of computation time under unfavorable conditions.

SUMMARY OF THE INVENTION

It is an object of the invention to provide a computer system for speech recognition which processes words previously unknown to the computer system in the simplest and most rapid manner possible.

This object is fulfilled by a computer system as initially discussed, in which means are provided for storing triphones and related fenemic sequences, where the fenemic sequence of a triphone comprises a number of acoustic labels.

If a new word occurs in a spoken text to be recognized by the computer, the new word is decomposed into triphones. The fenemic sequences associated with the triphones of the word are read from the triphone table of the invention, and are then concatenated to produce the fenemic baseform of the new word. The production of the fenemic baseform of a new word is thereby reduced to the retrieval and concatenation of fenemic sequences from the triphone table.

Since there are only a finite number of sounds in any language, the number of triphones is also finite. As a result, in a complete triphone table the fenemic sequence corresponding to every-possible triphone of a word is present. Each new word, decomposed into triphones, can thereby be constructed from the associated fenemic sequences using the complete triphone table. Consideration of similarities or the like is not required.

The fenemic sequences associated with the triphones are produced in accordance with the invention by first decomposing a spoken training text into triphones and then applying the growing algorithm to the triphones. The fenemic sequences stored in the triphone table are derived with the aid of the growing algorithm.

If the triphone table stored in the computer system is not complete, it is possible that a new word contains a triphone which cannot be located in the triphone table by the computer system. So that the fenemic baseform of the new word can also be formed in this case, it is possible, with aid of an additional uniphone table, 1.5-phone table, or a classified triphone table, to locate a fenemic sequence which corresponds essentially to the fenemic sequence of the missing triphone. This substitute fenemic sequence is then employed in forming the fenemic baseform of the new word.

BRIEF DESCRIPTION OF THE DRAWING

FIG. 1A shows a portion of a word table.

FIG. 1B shows a portion of a triphone table.

FIG. 2A shows a portion of a uniphone table.

FIG. 2B shows a portion of a 1.5-phone table.

FIG. 2C shows a portion of a classified triphone table.

FIG. 3 shows a flow diagram for producing the triphone, uniphone, etc., tables.

FIG. 4 shows a flow diagram for producing the fenemic baseform of a new word with aid of the triphone table.

DESCRIPTION OF THE PREFERRED EMBODIMENTS

Figure 5:
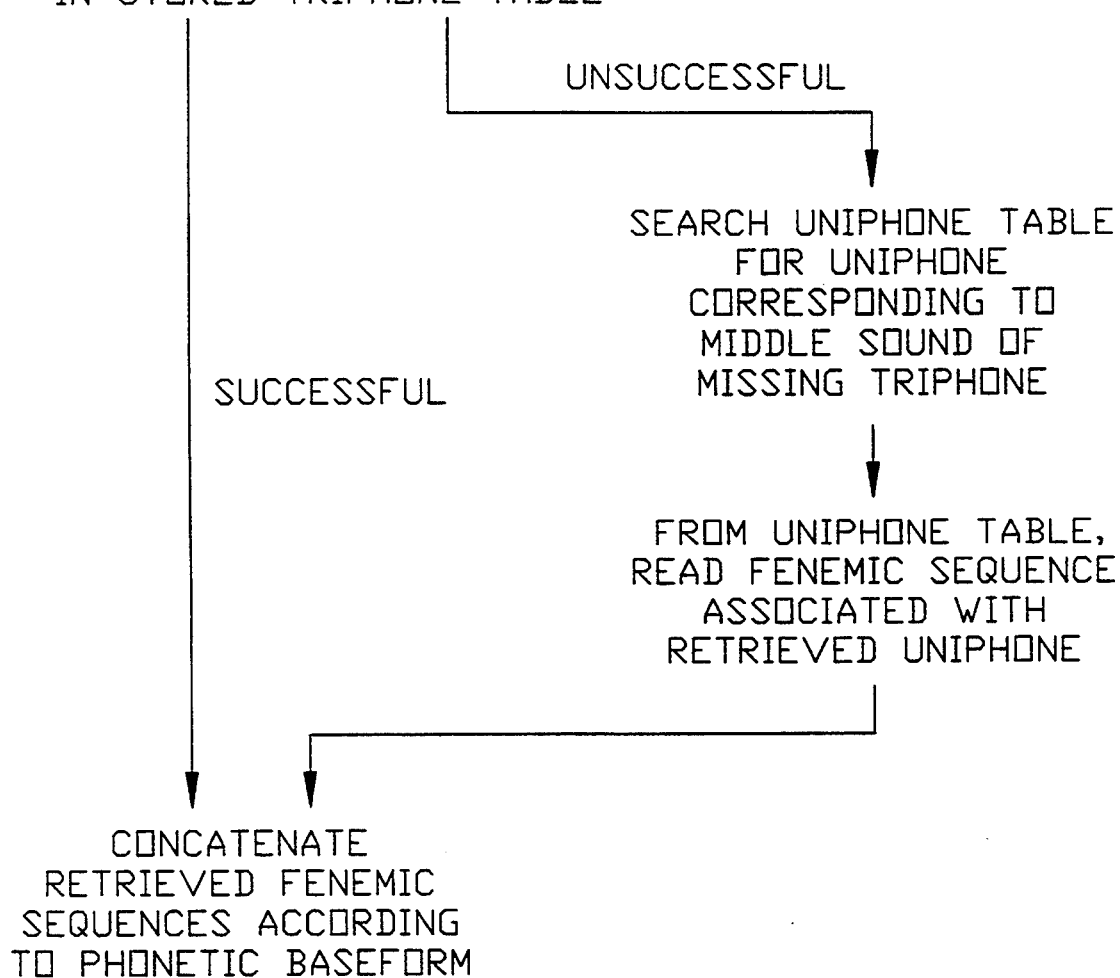
FIG. 5 shows a flow diagram for producing the fenemic baseform of a new word with the further aid of the uniphone table.

In the following description, it is assumed that a computer system for speech recognition is provided with means by which a text spoken by a speaker can be converted into acoustic labels. Normally, there are 200 such acoustic labels, which hereafter and in the figures are designated by numbers.

In conjunction with speech recognition, each word can be represented in a phonetic form as well as in its familiar written form. The phonetic spelling of a word is designated as the phonetic baseform of the word. This phonetic baseform thus consists of a sequence of sounds, whereby each sound has not only a specific pronunciation but also a specific length, hardness, etc. The German language contains a total of 65 such sounds, where this number includes interim sounds produced between two words spoken by a speaker.

Three such sounds placed in sequence are known as a triphone. Since the number of sounds in German is finite, the number of combinations of these sounds as triphones is also finite.

In a computer system, each sound is represented by a sequence of approximately 15 acoustic labels. For each word, therefore, there is a label sequence, which is known as the fenemic baseform of the word. The label sequence of a single sound is termed the learemic baseform of the sound.

In the following description, the label sequence associated with a triphone is denoted as the fenemic sequence of the triphone. It is important to note that this is not the label sequence of all three sounds of the triphone but essentially only that of the middle sound of the triphone. This label sequence of the middle sound is influenced, however, by the left- and right-hand sounds of the triphone. As a result, the fenemic sequence of a triphone, for example for the sound "A:", normally deviates from the leafemic baseform for this sound "A:" due to the sounds of the left-hand and right-hand neighbors.

The following table illustrates the meanings of the previously described terms for the word "Bahnhof".

TABLE

| Meaning | Terminology |
| --- | --- |
| Bahnhof | Word "Bahnhof" |
| B A: N H O: F | Phonetic baseform of "Bahnhof" |
| A: | Sound "A" |
| B A: N | Triphone "B" - "A:" - "N" |
| 172, 57, 79, 12, . . . . . . 92, 128, 19, 22 | Fenemic baseform of "Bahnhof" |
| 23, 151, 139, . . . | Leafemic baseform of the sound "A:" |
| 21, 151, 139, . . . | Fenemic sequence of the triphone "B" - "A:" - "N" |

FIG. 1A shows a portion of a word table, in which the fenemic baseform for each word is indicated. This word table is stored in the computer system for speech recognition. The fenemic base-forms of the individual words are produced by the computer system with the aid of a text spoken by a speaker, a so-called training text. For this purpose, the computer system converts the training text into a sequence of acoustic labels. Since the training text is known to the computer system, it is subsequently possible for the computer system to associate label sequences with specific words of the training text, that is, to decompose the label sequence associated with the words of the training text. Based on this decomposition, the so-called growing algorithm is then applied to the label sequences associated with the words. The purpose of the growing algorithm is to produce an optimal fenemic baseform for all possible pronunciations of a word. The results of the growing algorithm are the fenemic baseforms of the individual words, as shown in the word table in FIG. 1A.

The word table of FIG. 1A cannot contain all words and all associated fenemic baseforms occurring in German. This is due to the fact that the German language is continually acquiring new words, particularly new compound nouns, and that furthermore the number of technical terms, for example in the medical or pharmaceutical fields, is practically unlimited. The incompleteness of the word table in FIG. 1A thus means that the computer system for speech recognition is repeatedly confronted with new words not contained in the word table in FIG. 1A.

In order for these new words to be accommodated automatically by the computer system in the stored word table, the triphone table in FIG. 1B is employed. In the triphone table of FIG. 1B, the associated fenemic sequences for all possible triphones are indicated. As previously mentioned, the number of sounds and thus the number of triphones in the German language is finite. Therefore, the triphone table of FIG. 1B is a complete table with a finite number of entries.

The production of the fenemic sequences associated with the triphones is carried out as shown in FIG. 3, similarly to the production of the fenemic baseforms associated with the words. To this end, a training text spoken by a speaker and known to the computer system is decomposed into triphones. The growing algorithm is then applied to the sequences of acoustic labels associated with the triphones. For each triphone a fenemic sequence is thereby produced which optimally takes into consideration all possible pronunciations of the triphone. The fenemic sequences produced in this manner are indicated in the triphone table of FIG. 1B.

If the computer system is employed to recognize a text spoken by a speaker and previously unknown to the computer system, and to convert the text to written form, the spoken text is converted into a sequence of acoustic labels, as for the training text. There then follows a series of statistical comparisons which the computer uses to attempt to recognize the spoken text. In one of these statistical comparisons, the acoustic labels of the unknown spoken text are compared with the acoustic labels contained in the word table of FIG. 1A. The result of this comparison is normally a word whose fenemic baseform, as reflected by the word table of FIG. 1A, is closest to the label sequence of the unknown spoken text.

If a word of the spoken text is not contained in the word table of FIG. 1A, the comparison just discussed selects an incorrect word from the word table of FIG. 1A. This incorrect word must then be corrected by the user and can then be added to the word table of FIG. 1A if desired.

As shown in FIG. 4, the new word, unknown to the computer system, is converted to its phonetic baseform, i.e., its phonetic spelling. This phonetic baseform is then decomposed into all component triphones. This occurs in conjunction with adding an interim sound, denoted here by the letter "X", before and after the phonetic baseform. Then, the leading interim sound and the first two sounds of the phonetic baseform of the new word are isolated as the first triphone. The first three sounds of the phonetic baseform of the new word are used to form the next triphone. The subsequent triphone consists of the second through fourth sounds of the phonetic baseform of the new word. This method of producing triphones is continued until the trailing interim sound has been incorporated in a triphone. The triphone table of FIG. 1B shows an example of the decomposition of the word "Bahnhof", with the phonetic baseform "BA:NHO:F", into the associated triphones.

After the phonetic baseform of the new word has been decomposed into the associated triphones, the computer system selects the fenemic sequences associated with the triphones from the triphone table of FIG. 1B. These retrieved fenemic sequences are then concatenated according to the order of the triphones within the phonetic baseform. In this manner, the fenemic baseform of the new word is derived as the sum of the concatenated fenemic sequences of the triphones.

This fenemic baseform of the new word, synthetically produced with the help of the triphone table of FIG. 1B, can then be added to the word table in FIG. 1A.

The triphone table of FIG. 1B as described, as well as the described method of producing the fenemic baseforms in accordance with FIG. 4, can also be used to expand the word table of FIG. 1A generally. To this end, the computer system can be given a large number of, for example, medical terms via the keyboard. These new words are then decomposed into triphones with the help of a phonetizer, as previously described. The fenemic sequences associated with the triphones are then read from the triphone table of FIG. 1B. After these fenemic sequences have been concatenated in accordance with the phonetic baseform of the words, the synthetically produced fenemic baseforms of the new words can be added to the word table of FIG. 1A.

As previously mentioned, the number of sounds and thus the number of triphones in the German language is finite. This means that a complete triphone table corresponding to FIG. 1B can be generated. Such a complete triphone table, however, contains a very large number of entries. It is therefore possible that, due to the attendant high memory requirements and/or to the large amount of effort required to produce all of these entries, the triphone table is incomplete. This means that not all possible triphones and their associated fenemic sequences are contained in the triphone table. This can in turn mean that the computer system, in producing the fenemic baseform of a new word, encounters a triphone which cannot be found in the table of FIG. 1B.

In order that the fenemic baseform of a new word can also be produced in this case, a uniphone table as shown in FIG. 2A is employed, in which the fenemic sequence for each uniphone appears.

A uniphone is a single sound; the term uniphone was selected to clarify in particular the relationship of the uniphone table to the triphone table. Since, as noted, a uniphone comprises a single sound, the uniphone table for the German language contains exactly 65 uniphones with associated fenemic sequences.

The fenemic sequences associated with a uniphone are produced as shown in FIG. 3, in the same way as for the fenemic sequences associated with a triphone. To this end, a training text spoken by a speaker is converted by the computer system into acoustic label sequences. Since the training text is known, the computer system can then associate portions of these label sequences with certain sounds, that is, with certain uniphones. On this basis, the growing algorithm is then applied to the acoustic label sequences associated with the uniphones, producing fenemic sequences which optimally take into account every possible pronunciation of these uniphones. These fenemic sequences are entered in the uniphone table of FIG. 2A.

The application of the uniphone table of FIG. 2A is shown in FIG. 5.

If, in producing the fenemic baseform of a new word, a triphone of the phonetic baseform of the new word is not found in the triphone table of FIG. 1B, the uniphone table of FIG. 2A is then searched. The computer system looks for the uniphone which corresponds to the middle sound of the missing triphone. For example, if the triphone "P-A:-N" is not contained in the triphone table of FIG. 1B, the computer system searches for the uniphone "A:" in the uniphone table of FIG. 2A. Since the uniphone table of FIG. 2A contains all possible uniphones, the computer system always finds a fenemic sequence associated with the uniphone. The computer system now uses this sequence found in the uniphone table of FIG. 2A for the fenemic sequence not found in the triphone table of FIG. 1B. The substitute fenemic sequence from the uniphone table of FIG. 2A, as well as the further fenemic sequences from the triphone table of FIG. 1B, are then concatenated in a known manner in accordance with the phonetic baseform of the new word. The sum of all acoustic labels then forms the fenemic baseform of the new word and can be entered in the word table of FIG. 1A.

An additional or alternative possibility is the storage in the computer system of a 1.5-phone table as shown in FIG. 2B or a classified triphone table as shown in FIG. 2C.

The 1.5-phone table of FIG. 2B is based on the triphone table in FIG. 1B. However, rather than the complete acoustic label sequences associated with the left- and right-hand sounds, only the portions of these label sequences adjacent to the middle sound are used. This is indicated in FIG. 2B by the expressions "X/2" and "N/2". The growing algorithm is then applied in a known manner to the "shortened" triphones as shown in FIG. 3. The resulting fenemic sequences are entered in the 1.5-phone table of FIG. 2B.

The classified triphone table of FIG. 2C is also based on the triphone table of FIG. 1B. Rather than the left- and right-hand sounds, however, the classified triphone table of FIG. 2C employs sound classes (C1, C2, ... ), which for example indicate whether the sound is a vowel or a consonant, a sibilant or hummed, pronounced hard or soft, etc. On the basis of these classified triphones, the growing algorithm is applied in a known manner as shown in FIG. 3. The resulting fenemic sequences are contained in the classified triphone table of FIG. 2C.

If, in producing the fenemic baseform of a new word, the computer system is unable to locate a triphone of this new word in the triphone table of FIG. 1B, the computer system can search, either alternatively or cumulatively, the uniphone table of FIG. 2A, the 1.5-phone table of FIG. 2B, and/or the classified triphone table of FIG. 2C. The search is always based on the middle sound of the missing triphone. If the computer system finds the corresponding uniphone, 1.5-phone, or classified triphone in the tables in FIGS. 2A through 2C, respectively, the computer system reads the associated fenemic sequence from the table and uses this sequence to form the fenemic baseform of the new word.

We claim:

1. A computer system for speech recognition, comprising:
   means for producing phonetic baseforms of words;
   means for deriving triphones from the phonetic baseforms of the words;

means for producing all possible triphones of a language;

means for producing associated fenemic sequences from said all possible triphones;

a triphone table containing said all possible triphones and their associated fenemic sequences;

means for producing fenemic baseforms from the associated fenemic sequences;

a word table containing the words and the fenemic baseforms.

2. A computer system for speech recognition, comprising:

means for producing phonetic baseforms of words;

means for deriving triphones and uniphones from the phonetic baseforms of the words;

means for producing fenemic sequences associated with the triphones;

a triphone table containing the triphones and their associated fenemic sequences;

means for producing all possible uniphones of a language;

means for producing fenemic sequences associated with said all possible uniphones;

a uniphone table containing said all possible uniphones and their associated fenemic sequences;

means for producing fenemic baseforms from the fenemic sequences associated with the triphones and uniphones;

a word table containing the words and the fenemic baseforms.

3. The computer system of claim 2, further comprising:

means for deriving 1.5 phones from the phonetic baseforms of words;

means for producing all possible 1.5 phones of a language;

means for producing fenemic sequences associated with said all possible 1.5 phones;

a 1.5 phone table containing said all possible 1.5 phones and their associated fenemic sequences;

means for producing fenemic baseforms from the fenemic sequences associated with the 1.5 phones.

4. The computer system of claim 2, further comprising:

means for deriving classified triphones from the phonetic baseforms of words;

means for producing all possible classified triphones of a language;

means for producing fenemic sequences associated with said all possible classified triphones;

a classified triphone table containing said all possible classified triphones and their associated fenemic sequences;

means for producing fenemic baseforms from the fenemic sequences associated with the classified triphones.

5. A computer system for speech recognition, comprising:

means for producing phonetic baseforms of words;

means for deriving triphones and 1.5 phones from the phonetic baseforms of words;

means for producing fenemic sequences associated with the triphones;

a triphone table containing the triphones and their associated fenemic sequences;

means for producing all possible 1.5 phones of a language;

means for producing fenemic sequences associated with said all possible 1.5 phones;

a 1.5 phone table containing said all possible 1.5 phones and their associated fenemic sequences;

means for producing fenemic baseforms from the fenemic sequences associated with the triphones and 1.5 phones;

a word table containing the words and the fenemic baseforms.

6. A computer system for speech recognition, comprising:

means for producing phonetic baseforms of words;

means for deriving triphones and classified triphones from the phonetic baseforms of words;

means for producing fenemic sequences associated with the triphones;

a triphone table containing the triphones and their associated fenemic sequences;

means for producing all possible classified triphones of a language;

means for producing fenemic sequences associated with said all possible classified triphones;

a classified triphone table containing said all possible classified triphones and their associated fenemic sequences;

means for producing fenemic baseforms from the fenemic sequences associated with the triphones and classified triphones;

a word table containing the words and the fenemic baseforms.

7. A method of producing fenemic sequences of a word, for use in a computer system for speech recognition, comprising the steps of:

(a) deriving a phonetic baseform of the word;

(b) decomposing the phonetic baseform of the word into triphones;

(c) producing fenemic sequences associated with the triphones;

(d) storing the triphones and the fenemic sequences associated with the triphones in a triphone table;

(e) iterating steps (a) through (d) until the triphone table contains all possible triphones of a language and the fenemic sequences associated with said all possible triphones.

8. The method of claim 7, further comprising the steps of:

(f) inputting a new word whose fenemic baseform is to be produced;

(g) deriving a phonetic baseform of the new word;

(h) decomposing the phonetic baseform of the new word into ordered triphones;

(i) selecting the fenemic sequences from the triphone table that correspond to the ordered triphones of step (h);

(j) concatenating the fenemic sequences of step (i) according to the ordered triphones of step (h);

(k) storing the fenemic sequences of step (j) in a word table as the fenemic baseform of the new word.

9. A method of producing fenemic sequences of a word, for use in a computer system for speech recognition, comprising the steps of:

(a) deriving a phonetic baseform of the word;

(b) decomposing the phonetic baseform of the word into uniphones;

(c) producing fenemic sequences associated with the uniphones;

(d) storing the uniphones and the fenemic sequences associated with the uniphones in a uniphone table;

(e) iterating steps (a) through (d) until the uniphone table contains all possible uniphones of a language and the fenemic sequences associated with said all possible uniphones.

10. The method of claim 9, further comprising the steps of:
(f) decomposing the phonetic baseform of step (a) into triphones;
(g) producing fenemic sequences associated with the triphones;
(h) storing the triphones and the fenemic sequences associated with the triphones in a triphone table;
(i) inputting a new word having a triphone not contained in the triphone table;
(j) deriving a phonetic baseform of the new word;
(k) decomposing the phonetic baseform of the new word into ordered triphones;
(l) selecting the fenemic sequences from the triphone table that correspond to the ordered triphones of step (k);
(m) selecting the fenemic sequence from the uniphone table that corresponds to the triphone of step (i);
(n) concatenating the fenemic sequences of step (l) and step (m) according to the ordered triphones of step (k);
(o) storing the fenemic sequence of step (n) in a word table as a fenemic baseform of the new word.

11. A method of producing fenemic sequences of a word, for use in a computer system for speech recognition, comprising the steps of:
(a) deriving a phonetic baseform of the word;
(b) decomposing the phonetic baseform into 1.5 phones;
(c) producing fenemic sequences associated with the 1.5 phones;
(d) storing the 1.5 phones and the fenemic sequences associated with the 1.5 phones in a 1.5 phone table;
(e) iterating steps (a) through (d) until the 1.5 phone table contains all possible 1.5 phones of a language and the fenemic sequences associated with said all possible 1.5 phones.

12. The method of claim 11, further comprising the steps of:
(f) decomposing the phonetic baseform of step (a) into triphones;
(g) producing fenemic sequences associated with the triphones;
(h) storing the triphones and the fenemic sequences associated with the triphones in a triphone table;
(i) inputting a new word having a triphone not contained in the triphone table;
(j) deriving a phonetic baseform of the new word;
(k) decomposing the phonetic baseform of the new word into ordered triphones;
(l) selecting the fenemic sequences from the triphone table that correspond to the ordered triphones of step (k);
(m) selecting the fenemic sequence from the 1.5 phone table that corresponds to the triphones of step (i);
(n) concatenating the fenemic sequences of step (l) and step (m) according to the ordered 1.5 phones of step (k);
(o) storing the fenemic sequence of step (n) in a word table as a fenemic baseform of the new word.

13. A method of producing fenemic sequences of a word, for use in a computer system for speech recognition, comprising the steps of:
(a) deriving a phonetic baseform of the word;
(b) decomposing the phonetic baseform into classified triphones;
(c) producing fenemic sequences associated with the classified triphones;
(d) storing the classified triphones and the fenemic sequences associated with the classified triphones in a classified triphone table;
(e) iterating steps (a) through (d) until the classified triphone table contains all possible classified triphones of a language and the fenemic sequences associated with said all possible classified triphones.

14. The method of claim 13, further comprising the steps of:
(f) decomposing the phonetic baseform of step (a) into triphones;
(g) producing fenemic sequences associated with the triphones;
(h) storing the triphones and the fenemic sequences associated with the triphones in a triphone table;
(i) inputting a new word having a triphone not contained in the triphone table;
(j) deriving a phonetic baseform of the new word;
(k) decomposing the phonetic baseform of the new word into ordered triphones;
(l) selecting the fenemic sequences from the triphone table that correspond to the ordered triphones of step (k);
(m) selecting the fenemic sequence from the classified triphone table that corresponds to the triphones of step (i);
(n) concatenating the fenemic sequences of step (l) and step (m) according to the ordered triphones of step (k);
(o) storing the fenemic sequences of step (n) in a word table as a fenemic baseform of the new word.

* * * * *